T. F. BUCK.
SAFETY FENDER FOR AUTOMOBILES.
APPLICATION FILED DEC. 16, 1921.

1,415,518.

Patented May 9, 1922.

Inventor
Thomas F. Buck

Witness:
John Milton Jester

By D. A. Gowrick
Attorney

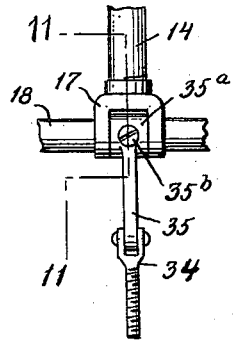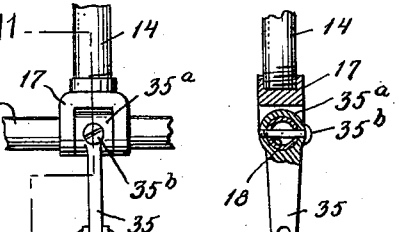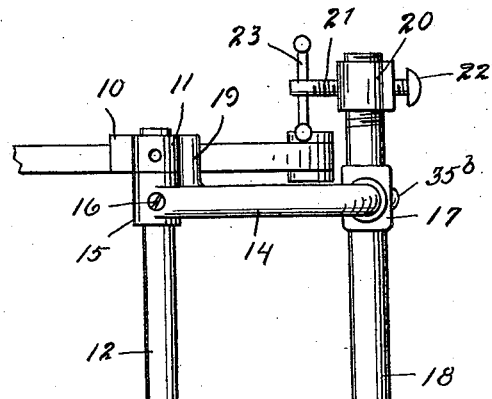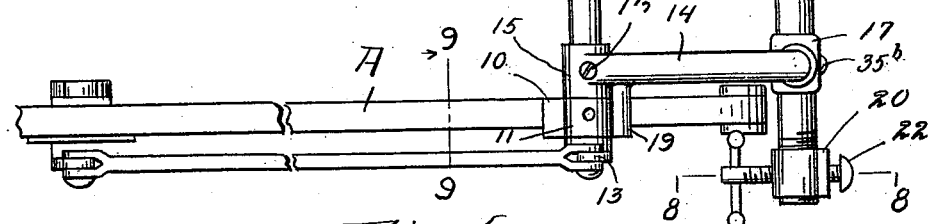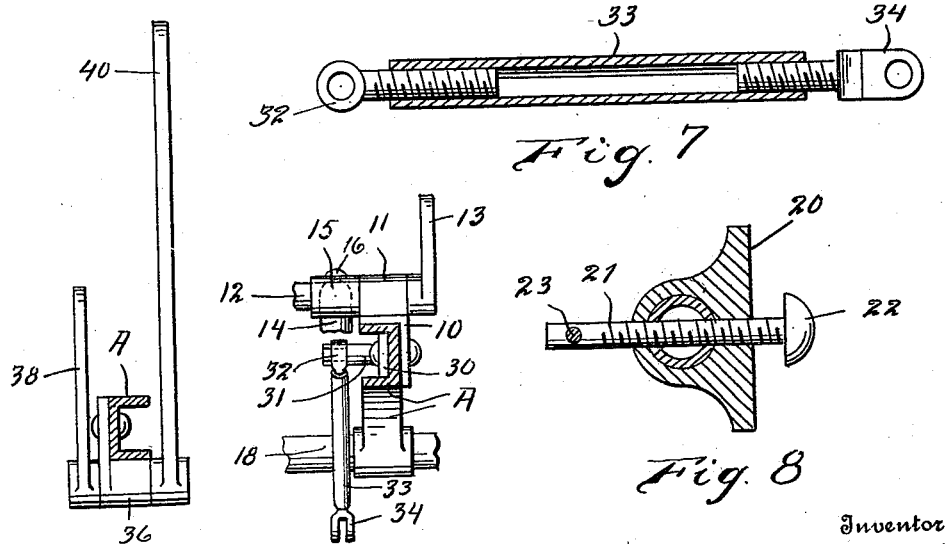

UNITED STATES PATENT OFFICE.

THOMAS F. BUCK, OF NEW CASTLE, PENNSYLVANIA.

SAFETY FENDER FOR AUTOMOBILES.

1,415,518.  Specification of Letters Patent.  Patented May 9, 1922.

Application filed December 16, 1921. Serial No. 522,832.

*To all whom it may concern:*

Be it known that I, THOMAS F. BUCK, a citizen of the United States, residing at New Castle, in the county of Lawrence and State of Pennsylvania, have invented certain new and useful Improvements in Safety Fenders for Automobiles, of which the following is a specification.

This invention relates to safety fenders for automobiles, trucks, and the like, and has for its object the provision of a fender or bumper which ordinarily approaches the ground rather closely and which is for the purpose of preventing running over a pedestrian struck by the vehicle and which has the additional function of tending to prevent injury to the vehicle itself in case of minor collisions.

An important object is the provision of a fender of this character which is provided with means operable by the driver whereby it may be elevated into inoperative position, as for instance when passing over rough or rocky ground which might cause injury to the fender.

Another object is the provision of a device of this character in which the fender proper is vertically adjustably connected with its supporting hangers whereby the distance between the fender and the surface of the ground traveled over may be varied independently of the swing movement above mentioned.

Still another object is the provision of a novel vise-like means for securing the fender proper upon its supports, release of this means permitting removal of the fender proper entirely when it is desired to gain access to the front of the vehicle as for instance when making repairs to the front axle assembly or to the radiator.

An additional object is the provision of a device of this character which will be simple and inexpensive in manufacture and installation, highly efficient in use, durable in service, and a general improvement in the art.

With the above and other objects and advantages in view, the invention consists in the details of construction to be hereinafter more fully described and claimed and illustrated in the accompanying drawings in which Figure 1 is a side elevation of the device in operative position.

Figure 5 is a plan view.

Figure 6 is a detail cross section on the line 6—6 of Figure 2.

Figure 7 is a detail section through the pivoted link.

Figure 8 is a detail section on the line 8—8 of Figure 5.

Figure 9 is a detail section on the line 9—9 of Figure 5.

Figure 10 is a detail front elevation of one of the supporting arms.

Figure 11 is a detail section therethrough and through the associated parts.

Figure 1:
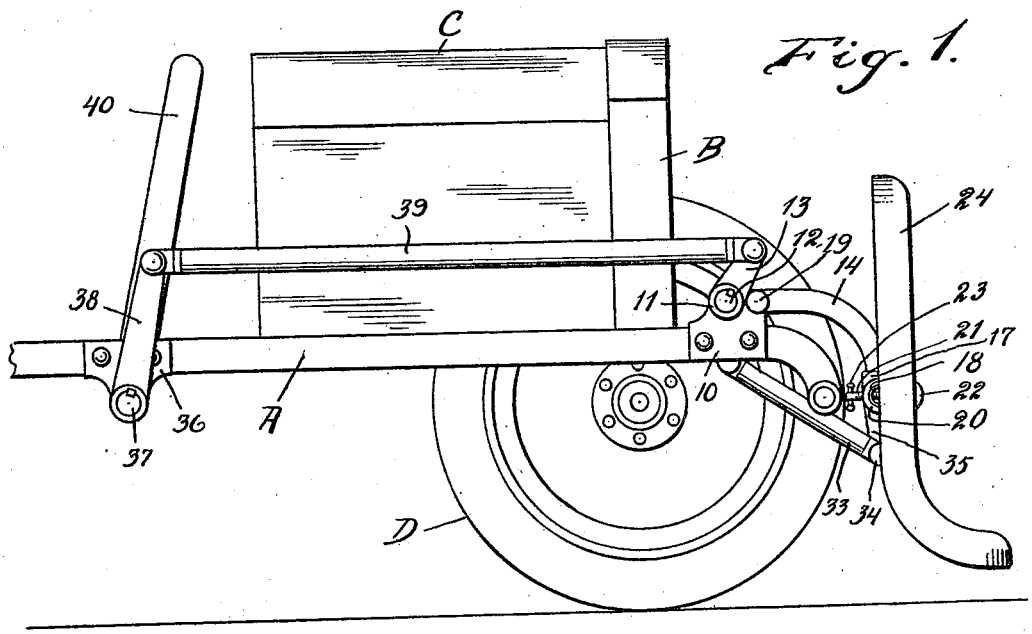
Figure 3:
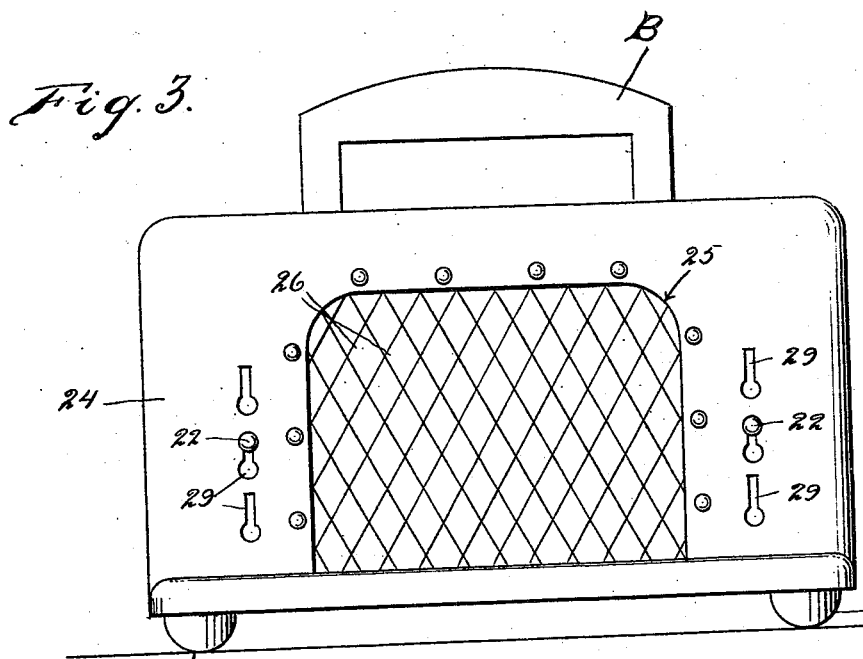
Figure 3 is a front view.

Referring more particularly to the drawings, the letter A designates the frame bars of an automobile chassis, B designates the radiator, C the hood, and D the front wheels. In carrying out my invention I provide a pair of brackets 10 which are secured, as for instance by riveting, upon the forward ends of the frame bars A, and which are formed with upstanding bearing portions 11. Rotatable through these bearing portions is a transverse shaft 12 and at one end this shaft is formed with a crank arm 13 for a purpose to be described.

Secured upon the shaft 12 near the frame bars A, are curved arms 14 which are provided at one end with the sleeve portions 15 held upon the shaft, as by means of set screws 16 or the like. At their other ends the arms 14 are threaded and have secured thereon U-shaped hangers 17 through which is revoluble a horizontal member 18 which may be formed as a hollow pipe or which might equally well be formed as a solid bar if preferred. The outer ends of the member 18 are threaded, as shown. Projecting from the sides of the arms 14 are spurs 19 which normally engage upon the frame bars A when the arms are in their lowermost positions, these spurs consequently acting as stops.

Screwed upon the threaded ends of the member 18 are brackets 20 which are consequently adjustable toward and away from each other. The outer or forward faces of the brackets 20 are flat, as indicated, and threaded through these brackets are bolts 21 having their forward ends provided with heads 22 and having their rear ends carrying transverse handles 23. Carried by the brackets 20 is the fender proper which is formed as a rectangular frame 24, preferably of sheet metal cut and stamped to shape and preferably having rounded corners, as indicated. This frame 24 is formed with a central cut out portion 25 which is covered with wire screen 26 and which is surrounded by reinforcing strips 27 riveted in place. Secured upon the rear side of the frame 24 at opposite sides of the opening 25 therein, are metal plates 28 which are formed with a plurality of key-hole slots 29, selected ones of which may be engaged upon the bolts 21. This fender proper is carried by the brackets 20 and is held thereon by engaging the bolts 21 through the proper or desired key-hole slots 29 and then turning down the bolts to bring the heads 22 thereof into firm clamping engagement with the plates 28 so that the fenders proper will be locked against accidental movement and against rattling.

Figure 2:
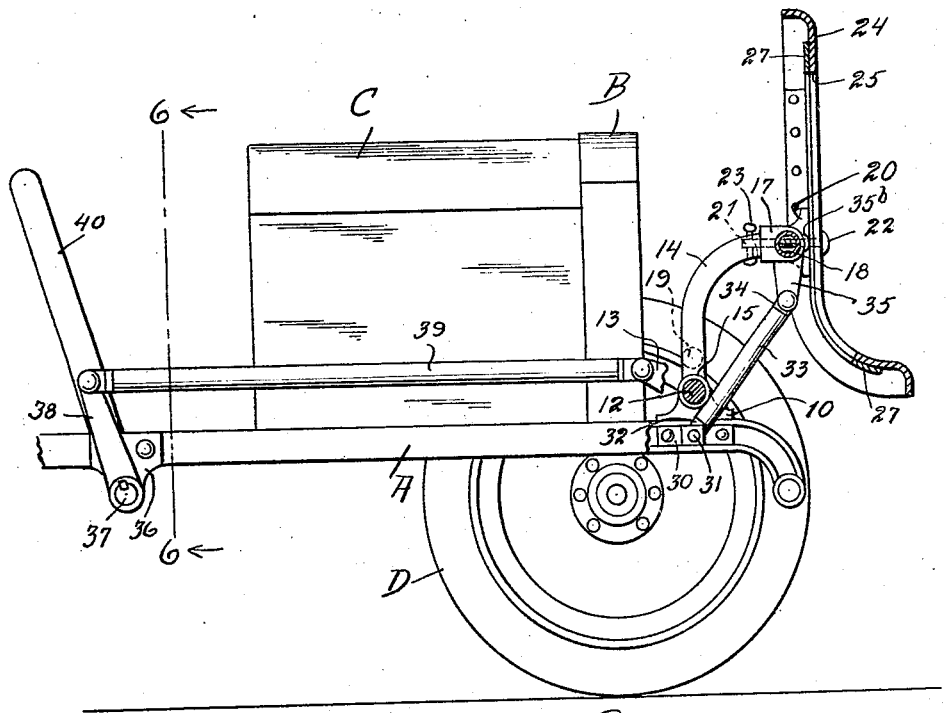
Figure 2 is an elevation with parts broken away and in section and showing the fender proper in its elevated position.
Figure 4:
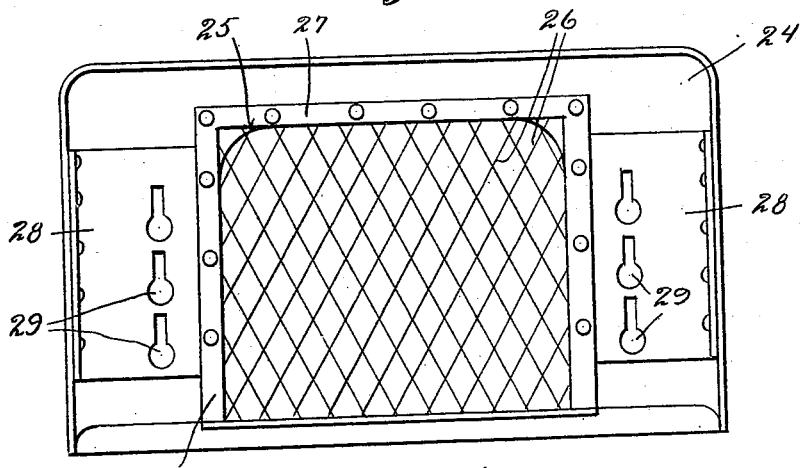
Figure 4 is a rear elevation of the fender proper.

Secured upon the frame bars, at the inner sides thereof, are plates 30 from which project studs 31 upon which are pivotally engaged bolts 32 which are threaded into sleeves 33 into the other ends of which are screwed eye bolts 34 which are pivotally connected with depending arms 35 formed integrally on sleeve members 35ᵃ secured, by screws 35ᵇ, on the member 18 within the hangers 17. The elements 32, 33 and 34 constitute longitudinally adjustable braces or links which operate to hold the fender proper in vertical position at all times regardless of whether it be in its normal or lower position, as indicated in Figure 1, or whether it be elevated into the inoperative position disclosed in Figure 2.

In order to effect movement of the fender proper from one position to the other, I provide a bearing 36 which is secured upon one frame bar and through which is journaled a shaft 37 having one end carrying an arm 38 with which is pivotally connected a reach rod 39 pivotally connected with the free end of the crank arm 13. Mounted upon the other end of the shaft 37 is an upright lever 40 which is within convenient reach of the operator of the vehicle.

The operation of the device is as follows:—

Ordinarily, that is when the use of the fender is desired, the lever 40 is in its forwardmost position, the curved arms 14 extend forwardly and the fender proper 24 approaches comparatively close to the ground. It will be obvious that in case a pedestrian is struck the fender will operate to prevent him from being run over by the wheels of the vehicle, and it is also apparent that the device will operate to protect the vehicle against serious injury in the event of a minor collision. Owing to the provision of the plurality of key-hole slots 29, it is apparent that the fender proper may be adjusted vertically with respect to the supporting arms so as to vary the distance between the fender and the ground. When, for any reason it is desired to elevate the fender proper, it is merely necessary that the operator pull back upon the lever 40 whereupon the reach rod 39 connected with the arm 13 will operate to rock the shaft 12 and this will result in upward swinging movement of the arms 14, carrying with them the member 18 and the fender proper so that the parts will be disposed in the position shown in Figure 2. The adjustable links formed by the members 32, 33 and 34 provide means for insuring the vertical position of the fender proper at all times.

From the foregoing description and a study of the drawings it will be apparent that I have thus provided a simply constructed and consequently inexpensive fender which is easily installable upon an automobile truck or the like without necessitating any alterations therein, the device being furthermore easily assembled from the operator's seat to vary the position when desired.

While I have shown and described the preferred embodiment of my invention, it is of course to be understood that I reserve the right to make such changes in the form, construction and arrangement of parts as will not depart from the spirit of the invention or the scope of the subjoined claims.

What is claimed is:—

1. A safety fender for motor vehicles comprising bracket members secured upon the forward ends of the frame bars of the vehicle, a rock shaft journaled through said brackets, arms carried by said shaft, a fender proper carried by said arms and detachably associated therewith, adjustable link members pivotally connected with the frame and with said arms, and means for rocking said shaft.

2. A safety fender for motor vehicles comprising a pair of bracket members secured to the forward ends of the frame bars of the vehicle, a rock shaft journaled through said bracket members, arms secured to said shaft and provided at their free ends with bearing heads, a bar revolubly mounted through said heads, a fender proper vertically adjustably and detachably mounted upon said last named member, and means for rocking said shaft.

3. A safety fender for motor vehicles comprising a pair of bracket members secured to the forward ends of the frame bars of the vehicle, a rock shaft journaled through said bracket members, arms secured to said shaft and provided at their free ends with bearing heads, a bar revolubly mounted through said heads, a fender proper vertically adjustably and detachably mounted upon said last named member, and means for rocking said shaft, said means comprising a lever pivoted in reach of the driver of the vehicle, a reach rod connected with said lever, and an arm on said shaft connected with said reach rod.

4. A safety fender for automobiles comprising a pair of bracket members secured upon the forward ends of the vehicle frame, a horizontal shaft journaled through said bracket members, a pair of arms secured upon said shaft and terminating in bearing sleeves, a horizontal bar revoluble through said sleeves, brackets adjustably mounted upon the ends of said horizontal bar, means for rocking said shaft, and a fender proper detachably connected with said last named brackets.

5. A safety fender for automobiles comprising a pair of bracket members secured upon the forward ends of the vehicle frame, a horizontal shaft journaled through said bracket members, a pair of arms secured upon said shaft and terminating in bearing sleeves, a horizontal bar revoluble through said sleeves, brackets adjustably mounted upon the ends of said horizontal bar, means for rocking said shaft, and a fender proper detachably connected with said last named brackets, said detachable connection consisting of bolts threaded through the last named brackets and having their forward ends provided with heads, and the fender proper being formed with a plurality of key-hole slots selectively engageable upon said bolts, the bolts being rotatable whereby to clamp the fender proper.

6. A safety fender for automobiles comprising a pair of bracket members secured upon the forward ends of the vehicle frame, a horizontal shaft journaled through said bracket members, a pair of arms secured upon said shaft and terminating in bearing sleeves, a horizontal bar revoluble through said sleeves, brackets adjustably mounted upon the ends of said horizontal bar, means for rocking said shaft, and a fender proper detachably connected with said last named brackets, the fender proper comprising a frame having its central portion open and covered with wire screen.

7. In a safety fender for automobiles, a support carried by the automobile frame, a fender proper formed with a plurality of key-hole slots, and means for clamping the fender proper with respect to the support comprising members carried by the support and having headed ends passing through the key-hole slots, and means for moving said headed members longitudinally to exert a clamping action upon the fender proper.

8. In a safety fender for automobiles, a supporting structure carried by the automobile frame, a fender proper formed with holes, and means for clamping the fender proper with respect to the supporting structure comprising bolts threaded through the supporting structure and having one end formed with heads passing through the holes in the fender proper and having their other ends provided with handles.

In testimony whereof I affix my signature.

THOMAS F. BUCK.